J. Ingels,
Seeding Machine.
No. 3,976. Reissued May 17, 1870.
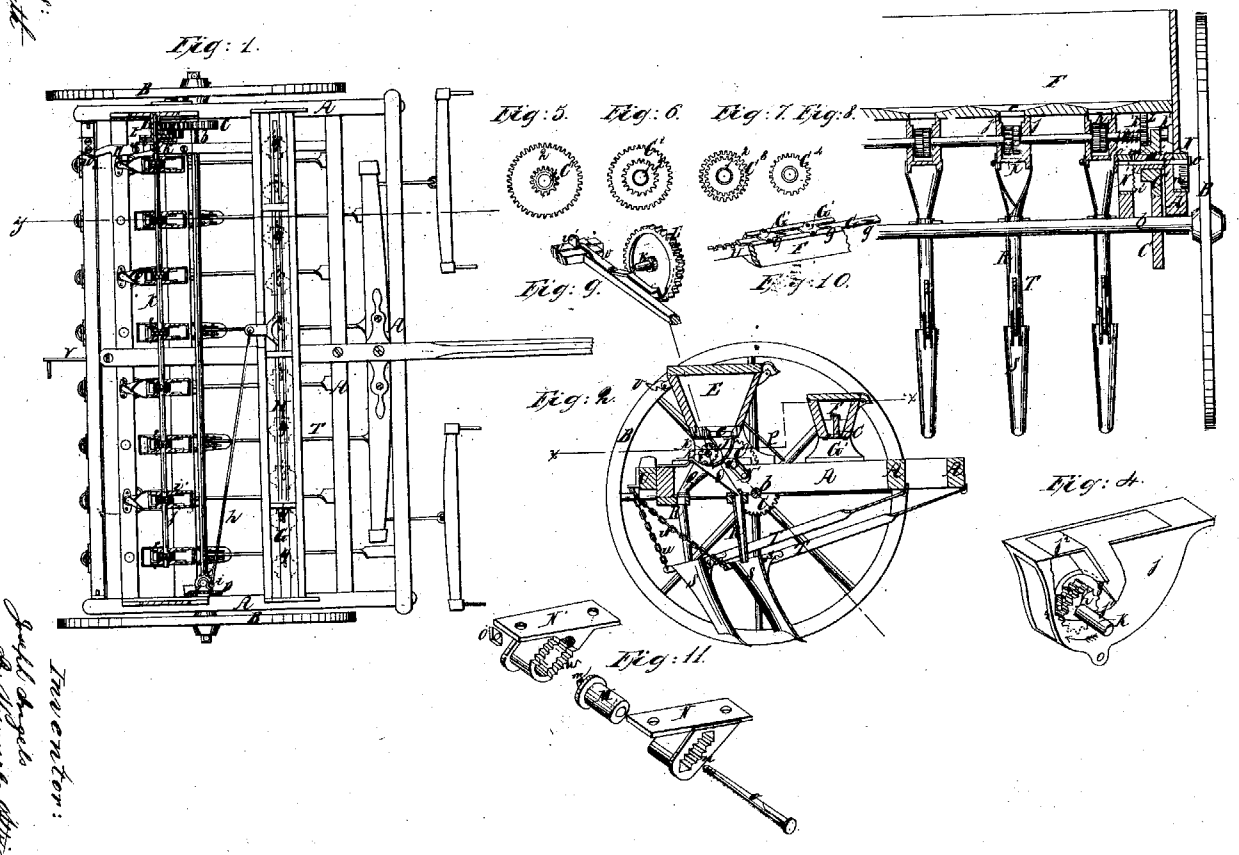
Witnesses:
Charles Smith
J. Fischer
Inventor:
Joseph Ingels
By Munn & Co. Attys.
N. PETERS, PHOTO-LITHOGRAPHER, WASHINGTON, D. C.

United States Patent Office.

JOSEPH INGELS, OF MILTON, INDIANA.

*Letters Patent No.* 37,345, *dated January* 6, 1863; *reissue No.* 3,976, *dated May* 17, 1870.

IMPROVEMENT IN GRAIN-DRILLS.

The Schedule referred to in these Letters Patent and making part of the same.

*To all whom it may concern:*

Be it known that I, JOSEPH INGELS, of Milton, in the county of Wayne and State of Indiana, have invented certain new and useful Improvements in Grain-Drills or Seeding-Machines; and I do hereby declare the following to be a full, clear, and exact description of the same, reference being had to the accompanying drawings making a part of this specification, in which—

Figure 1 represents a top plan of the machine, the seed-hoppers being cut away to show the parts otherwise concealed by them.

Figure 2 represents a vertical cross-section taken through the machine at the line *y y* of fig. 1.

Figure 3 represents an oblique section taken through the line *z z* of fig. 2.

Figure 4 represents in perspective, and on an enlarged scale, one of the secondary or delivery hoppers, with a portion of its shell broken away to show the interior thereof.

Figures 5, 6, 7, and 8 represent different-sized gears, which may be employed to change or vary the quantity of seed sown or delivered, as may be required.

Figure 9 represents a perspective view of the clutch-wheel, and device for operating the same.

Figure 10 represents in perspective a view of a portion of the under side of the grass-seed hopper.

Figure 11 represents in perspective, and on an enlarged scale, the manner of attaching and adjusting the shaft upon which the movable intermediate gear-wheels run.

Similar letters of reference, where they occur in the several separate figures, denote like parts of the machine in all of the drawings.

My invention consists, first, in combination with the concaves or secondary hoppers, and a seed-wheel turning therein, projecting flanges or cheeks on the inner sides thereof, and opposite the ends of the seed-wheel; and My invention further consists in casting the cheeks on the inside of the concave, on and with the concave itself; and My invention further consists in a combination of concave, inclined plate, cheeks, and feed-wheel; and My invention further consists in the use of interchangeable, reversible, intermediate gear-wheels, for regulating the quantity of grain to be sown; and My invention further consists in the manner of connecting and adjusting the interchangeable and reversible gear-wheels between the driving and the driven shafts; and My invention further consists in a combination of lever, cam, pivoted bar, and gear, for disconnecting said gear from its shaft, when the hoes are raised up from the ground; and My invention further consists in a movable bottom or gauge-plate, perforated with tapering holes, in combination with supporting brackets, that may cover such part or portion of the openings as may be required in regulating the quantity of seed to be sown or passed through them.

To enable others skilled in the art to make and use my invention, I will proceed to describe the same with reference to the drawings.

The main frame A of the machine is carried upon the wheels B B′, the former of which is keyed or fastened to the axle *b*, while the latter, B′, runs loosely on said axle, so as to adapt the machine to turn freely.

The axle *b* carries an ordinary cog-wheel, C, and a bevel gear-wheel, D, the uses of which will be hereafter explained.

A grain-hopper is shown mounted on the main frame at E, and another hopper for grass-seed at F.

The bottom of the hopper F is formed of a gauge, G, supported by brackets G′, and perforated with tapering apertures *g*, which may, by the adjustment of the plate G, be made to project beyond the edges of the brackets, to any suitable distance, so as to expose or disclose such an area of aperture as may be best adapted to the kind and quantity of seed to be sown.

A stirrer, H, is also connected with the hopper, which stirrer has a reciprocating motion given to it through the medium of a connecting-rod, *h*, working upon an eccentric wrist, *i*, on the upper end of a vertical shaft, I, which receives a rotary motion from the bevel gear-wheel D, upon the axle *b*, gearing with the bevel pinion $i^1$ on the shaft I.

Through the perforated bottom *e* of the grain-hopper E, the grain is received in feed-boxes or delivery-boxes J, of peculiar construction, constituting secondary hoppers, one of which is employed for every hoe or drill-tooth. The construction of these secondary or delivery-hoppers will be better understood by reference to fig. 4 of the drawings, which is on an enlarged scale.

In this hopper *j* is a "concave," cast in one piece, with cheeks $j^1$ $j^1$ projecting inward from each side, to afford end bearings for the feed-wheel K.

An inclined plate, $j^2$, covers the feed-wheel in such a manner as to prevent the descent of grain in the rear of the wheel.

The wheels K are formed on their peripheries with teeth or cavities, as shown, and are all secured to a common shaft, *k*, which extends from side to side of the machine, and is rotated in the direction indicated by the arrow, through the medium of a double, reversible, intermediate gear-wheel, $C^1$, gearing with the wheel C upon the axle *b*, and with the cogged gear L upon the shaft *k*.

In the illustration given in the drawings, the smaller part 1 of the wheel $C^1$ gears with the wheel L, and the largest part 2 gears with the wheel C. The effect of this arrangement of gears will be to rotate the shaft *k*, carrying the feed-wheels, at a lower rate of speed. But by reversing the wheel $C^1$, the rate of rotation of the feed-shaft, and consequently of the feed or delivery-wheels K, will be largely increased.

Fig. 5 shows the relative diameter of the two parts of the wheel $C^1$;

Fig. 6 shows a wheel, $C^2$, formed in two parts of more nearly equal diameter, but having a combined diameter equal to that of the two parts of the wheel $C^1$;

Fig. 7 shows a wheel in which the two parts are still more nearly equal in diameter; and Fig. 8, one in which the two parts are of equal diameter.

The sum of the radii of the two parts of each of the respective wheels being equal, it will be evident that either wheel, in whichever of its two positions it may be placed, will exactly occupy the space between the peripheries of the wheels C and L, but every change in the wheels $C^1$ $C^2$ $C^3$ $C^4$ changes the center upon which they turn.

To provide for the change and reversibility of the wheels, a hollow shaft, M, is made, which is held in any required position between two slotted brackets, N N′, by means of a tapering horizontal bolt, O, passing through the said shaft, and provided at one end with a head, *o*, and at the other with a clamp-nut, *o′*. The slots in the brackets N N′ extend directly between the axle *b* and shaft *k*, so that the adjustment of the hollow shaft M, up or down, in the said slots will vary its relative distance from the axle *b* and shaft *k*, as may be needful.

To secure the shaft in any required position, the bolt O is squared or tongued for a short distance near its head, so as to fit in notches *n* within the bracket N; and the inner end of the hollow shaft M is provided with tongues *m*, which engage in notches *n′* on the face of the bracket N′, when the bolt and shaft are drawn up tight by means of the nut *o′*. The notches in the brackets N N′ correspond in number with the changes of which the wheels are susceptible. In the present illustration, the four wheels (three of them being reversible ones) are capable of seven changes, and accordingly there should be seven notches in each of the brackets.

To use the wheel $C^1$, the shaft is fixed in either the upper or lower notches, as the case may. To use the wheel $C^2$, the shaft is fixed in the notches next to the upper or lower ones; for the wheel $C^3$, in those immediately above or below the center; and for the wheel $C^4$, in the center notches.

A hinged cap or hood, P, is furnished for covering the gear-wheels, to prevent dirt or trash from falling upon them and choking or injuring them.

The wheel L is fitted to turn loosely on the shaft *k*, but imparts rotation thereto in one direction by means of a ratchet-rack, $k^1$, with which it is pressed in contact by a spring, $k^2$. By this arrangement the backward motion of the wheel B is made to turn the wheel L freely upon the shaft *k*, without imparting any motion thereto.

From the delivery-hoppers J the grain is discharged into spouts Q, which convey it to flexible tubes R, communicating with the hollow drill-teeth or hoes S, in the usual manner.

The hoes S are each provided with two flanges, *s*, by which they are pivoted and braced, by iron and wooden pins, to the drag-bars T, hinged to the forward part of the frame. The hoes may be arranged either in a single rank across the machine, or (as in the present drawings) in two ranks, one in advance of the other, the spouts G being inclined alternately backward and forward to convey the grain to the tubes.

The drill-teeth or hoes are suspended, by chains *u*, from a hinged bar, U, which is provided with a lever, V, by means of which it may be turned up, to raise all the hoes simultaneously, in which position the lever is held by a catch, *v*, upon the hopper, when it is desired to remove the machine from place to place, without depositing seed.

To prevent the operation of the seeding mechanism while the hoes are elevated, the bar U is provided with a projecting plate, *u′*, which, when the said bar is turned up, acts upon the rear end of the lever W, fulcrumed at *w* to the main frame, and engaging over a flange, *l′*, on the wheel L, so as to draw the said wheel out of contact with its clutch, and thus permit the wheel to turn freely on the shaft.

Having thus fully described my invention,

What I claim therein as new, and desire to secure by Letters Patent, is—

In combination with the concaves or secondary hoppers, and a seeding-wheel turning therein, the projecting flanges or cheeks on the inner sides of said hoppers, and opposite the ends of the seed-wheel therein, substantially as described and represented.

Also, in combination with the secondary hoppers or seed-cups, the casting of the cheeks or flanges on and with the concave, hopper, or cup, when it is cast, substantially as represented.

Also, the combination of the concave *j*, inclined plate $j^2$, cheeks $j^1$, and feeding or seeding-wheel K, as and for the purpose described and represented.

Also, in a seed-drill or planter, the interchangeable, reversible, intermediate gears or gear-wheels, for regulating the machine for sowing a given quantity of seed, and changing that quantity at pleasure, as described.

Also, the combination of the shaft, brackets, and bolt, for regulating and adjusting the interchangeable, reversible, intermediate gears, in relation to the driving and driven shafts, substantially as described.

Also, the combination of the lever W, cam *u′*, pivoted bar U, and wheel L, for disconnecting said wheel from its shaft, by the act of raising the hoes, substantially as described.

JOSEPH INGELS.

Witnesses:
D. P. LEIBHARDT,
DAVID G. KERN.